2,953,931
POWER TRANSMISSION MECHANISM FOR LAWN MOWERS

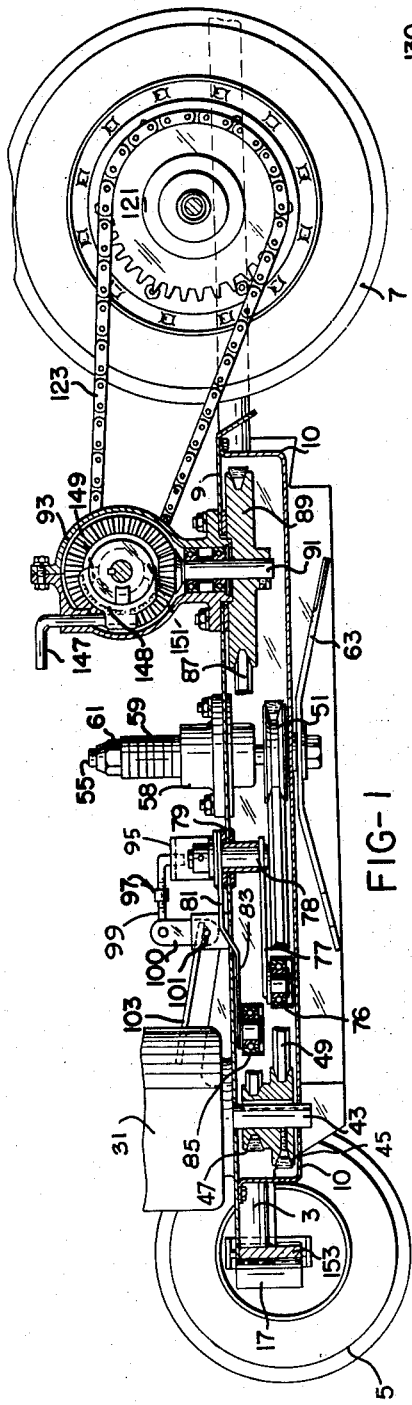
Sept. 27, 1960     O. MUSGRAVE     2,953,931
POWER TRANSMISSION MECHANISM FOR LAWN MOWERS
Original Filed Aug. 16, 1954
*INVENTOR.*
ORLY MUSGRAVE
ATTORNEY

Orly Musgrave, 1731 Audubon Park Drive, Springfield, Ohio

Original application Aug. 16, 1954, Ser. No. 450,141, now Patent No. 2,891,370, dated June 23, 1959. Divided and this application Apr. 24, 1959, Ser. No. 808,780

2 Claims. (Cl. 74—378)

This invention relates generally to power driven, rider-controlled grounds tending equipment and more specifically to power lawn mowers.

This application is a division of Serial No. 450,141, filed August 16, 1954, entitled: "Power Lawn Mower" now Patent No. 2,891,370, granted June 23, 1959.

It is a primary object of this invention to provide power transmission mechanism having manual control means which may be conveniently accessible to an operator of such a power mower.

Another object of the invention is the provision in a rider-controlled power driven lawn mower of novel transmission mechanism.

The invention will be more fully understood by reference to the following detailed description and accompanying drawings wherein:

Figure 1 is a fragmentary view in elevation and partially in section illustrating a power lawn mower structure which incorporates the power transmission mechanism of the invention;

Figure 2 is a detail view partially in section of a portion of the structure of Figure 1;

Figure 3 is a sectional view of the power transmission mechanism of Figure 1 and taken at right angles to the showing in Figure 1; and Figure 4 is a perspective view, enlarged, of a portion of the structure of Figure 3.

Referring to the drawings there is shown in Figure 1 the ground supporting power transmission structure of a lawn mower; the mower is provided with a tubular frame 3, forward ground wheels 5, and rearward driving ground wheels 7 which support the frame in close proximity to the ground. A floor plate 9 is provided with a suitably bolted bottom 10 and has foot-receiving wings 11 one of which is shown in Figure 2; floor plate 9 is suitably welded to the frame 3 and supports the power means and control mechanism of the mower.

A steering post collar 17 is supported by and forwardly of a cross-bar 153 for suitable mounting of steering means (not shown) of the mower.

Referring now particularly to Figure 1, the floor plate 9 is secured to and supports the engine 31.

The driving shaft 43 of the engine passes vertically through the floor plate 9 and bottom 10 and carries (Figure 1) on its lower end two V-belt pulleys 45 and 47 which are in the enclosure formed by the floor plate and bottom. Pulley 45 is of the larger diameter and is operably connected by belt 49 with a V-belt pulley 51 mounted respectively on spindle 55.

Spindle 55 passes vertically through floor plate 9 and the closing bottom 10 and is supported by bearings 57 (Figure 2) the housing 58 for which is suitably bolted and welded to the floor plate as indicated in Figures 1 and 2; the housing supports a plurality of spacer elements 59 which are loosely positioned about the spindle and retained in place by nut 61 secured on the upper end of the spindle.

Pulley 51 is shouldered at 52 (Figure 2) and the shoulder portion receives a set screw 54 to the spindle and is carried on the spindle 55 which passes through an aperture of bottom 10 and is provided with a cutting blade 63 securely retained in position by washer 65 and nut 67. The spacer elements provide for adjustment of blade height.

The blade 63 may be easily mounted and de-mounted and the blade shape chosen with the nature of the material to be cut.

Plate 9 (Figure 2) also supports idler pulley 71 which is rotatably carried on a fixed shaft 72 retained on an apertured piece 73 slidable beneath the plate 9 in a guide (not shown) and lockable to the plate in adjusted position by nut 75. Thus the tightness of belt 49 which passes against idler pulley 71 is controllable.

A second idler pulley 76 also bears against belt 49 when the mower is in operation. This pulley is carried on an arm 77 which is welded to a rotatable shaft 78 supported by a sleeve bearing unit 79 welded to plate 9.

Shaft 78 also mounts a bell crank 81 the inner arm 83 of which extends below plate 9 and mounts idler pulley 85 which pulley in the operative condition engages a drive belt 87 and tightens the same for transmission of power to pulley 89 (Figures 1 and 3) carried on shaft 91 of gear box 93 (Figures 1 and 3). Normally a spring secured to plate 9 biases the bell crank to an inoperative position in known manner.

The other and outer arm 95 of bell crank 81 is suitably coupled adjustably at 97 to an arm 99 fixedly carried between ears 100 which (Figure 1) are rockably supported on shaft 101 which carries the foot pedal 103. The ears are secured to plate 9 in any convenient manner.

Stepping on pedal 103 causes ears 100 and arm 99 to rock leftwardly (Figure 1) carrying with it arm 95 and causing the bell crank to pivot at shaft 78. The inner arm 83 which passes downwardly through plate 9 then moves idler pulley 76 into contact with belt 87 to thus cause actuation of shaft 91 of the gear box 93. Thus movement of pedal 103 simultaneously drives the mower and the mower blade.

Power is transmitted through gear box 93 to the rear wheels 7 by means of sprocket 121 and chain 123.

The closely spaced relation of the rear driving wheels 7, on either side of the center line of the mower, provides improved stability in the mower and eliminates the necessity for a differential. The arrangement permits ease of turning and no undue wear occurs.

Shaft 127 of gear box 93 carries key 129 (Figure 4) on which a body indicated generally at 130 is slidably mounted but is non-rotatable with respect to the shaft 127. The body 130 comprises disc portions 131 and 133, each of which are provided with lugs. Shafting 127 is itself rotatably mounted in bearings 135 and 137 supported by the casing of the gear box. Also loosely mounted on shaft 127 are spaced bevel gears 139, 141, each of which are hollow and the hollows of which are provided with cross pieces 143, 145, respectively, for engagement with the lugs of the discs.

The bevel gears 139, 141 are engaged by bevel gear 148 carried on shaft 91 and when shaft 91 is rotated through pulley 89 each of the gears 139, 141 rotates loosely on the shaft. By moving the disc 131 into engagement with gear 139 movement of the mower is effected in a forward direction; when the lug of disc portion 133 is moved rightwardly (Figure 3) reversal of direction is effected. When neither lug is engaged the mower is in neutral and the gears 139, 141 are loose on the shaft.

Sliding movement for engagement of the body 130 is effected through bent rod 147 (Figure 1). The lower end of rod 147 is connected by collar 148 between the portions 131, 133 rigidly at 149, 151 (Figure 1).

Gear box 93 is itself filled with oil and spaced well from the engine to minimize heat effects.

The mower is operable in forward and reverse directions and the arrangement of hood and wheels effectively inhibit the entry of cut material to the chain in the reverse direction of operation. This is particularly important as fouling of driving mechanism in lawn mowers is a serious factor, normally resulting in stalling of the equipment.

The transmission mechanism for controlling the forward and reverse movements is particularly adaptable for mower use, economical, free of mechanism which would require frequent repair, and eliminates the need for a differential mechanism. Most important is the compactness afforded by the bevel gears and the webs in the hollow thereof. Such compactness is essential to permit the box to be mounted appropriately within the relatively narrow frame width common to riding type mowers.

It will be understood that this invention is susceptible to modification in order to adapt it to different usages and conditions and accordingly, it is desired to comprehend such modifications within this invention as may fall within the scope of the appended claims.

What is claimed is:

1. In power transmission mechanism suitable for power driven lawn mowers, a gear box casing, a first horizontally extending power transmission shaft rotatably mounted in the gear box and projecting therefrom, first and second bevel gears coaxially disposed on the said first shaft in spaced opposed relation and mounted for rotational movement relative to the said first shaft, a second vertically extending shaft journaled in the gear box and also projecting from the gear box, a third bevel gear on an inner and upper end portion of said second shaft and in engagement with said spaced first and second bevel gears arranged for driving said first and second gears in opposite directions of rotation, said first and second bevel gears having hollows in the form of recesses coaxial with the said first shaft, a cross piece extending substantially diametrically across the recess and in the recess of each of said first and second bevel gears, a body member slidably but non-rotatably connected with and supported by the said first shaft and coaxial with the said first shaft, said body member comprising spaced disc portions positioned between but free of the first and second said bevel gears, a lug projecting from each of said disc portions, one towards and being receivable in the recess of said first bevel gear and the other towards and being receivable in the recess of said second bevel gear, and manual means extending into the interior of the casing and connected with said body member for moving said body member slidably on said shaft towards either of said first and second bevel gears whereby a said lug engages in a recess of a bevel gear for engagement with the cross-piece of the gear.

2. In power transmission mechanism suitable for power driven lawn mowers, a gear box casing, a first horizontally extending power transmission shaft rotatably mounted in the gear box and projecting therefrom, first and second bevel gears coaxially disposed on the said first shaft in spaced opposed relation and mounted for rotational movement relative to the said first shaft, a second vertically extending shaft journaled in the gear box and also projecting from the gear box, a third bevel gear on an inner and upper end portion of said second shaft and in engagement with said spaced first and second bevel gears arranged for driving said first and second gears in opposite directions of rotation, said first and second bevel gears having hollows in the form of recesses coaxial with the said first shaft, a cross piece extending substantially diametrically across the recess and in the recess of each of said first and second bevel gears, a body member slidably but non-rotatably connected with and supported by the said first shaft and coaxial with the said first shaft, said body member comprising spaced disc portions positioned between but free of the first and second said bevel gears, a lug projecting from each of said disc portions, one towards and being receivable in the recess of said first bevel gear and the other towards and being receivable in the recess of said second bevel gear, a collar secured to the said body member between the said spaced disc portions, and a shiftable rod carried by the collar extending substantially vertically upwardly from the casing whereby movement of the body member slidably on the said first shaft may be effected.

References Cited in the file of this patent

UNITED STATES PATENTS

| 676,440 | Mills | June 18, 1901 |
| 2,131,531 | Behrens | Sept. 27, 1938 |
| 2,150,150 | Burrows et al. | Mar. 14, 1939 |
| 2,155,525 | Bendhein et al. | Apr. 25, 1939 |